Patented June 12, 1923.

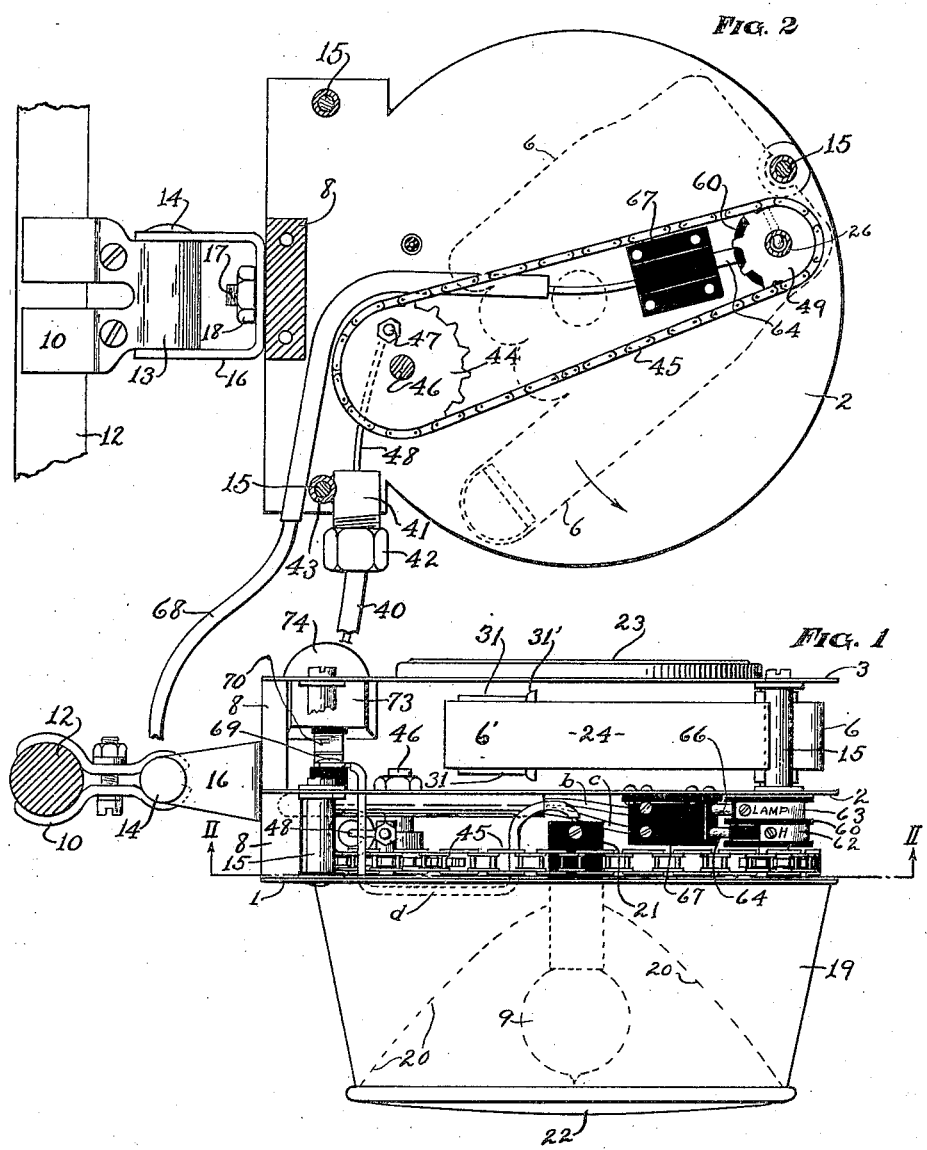

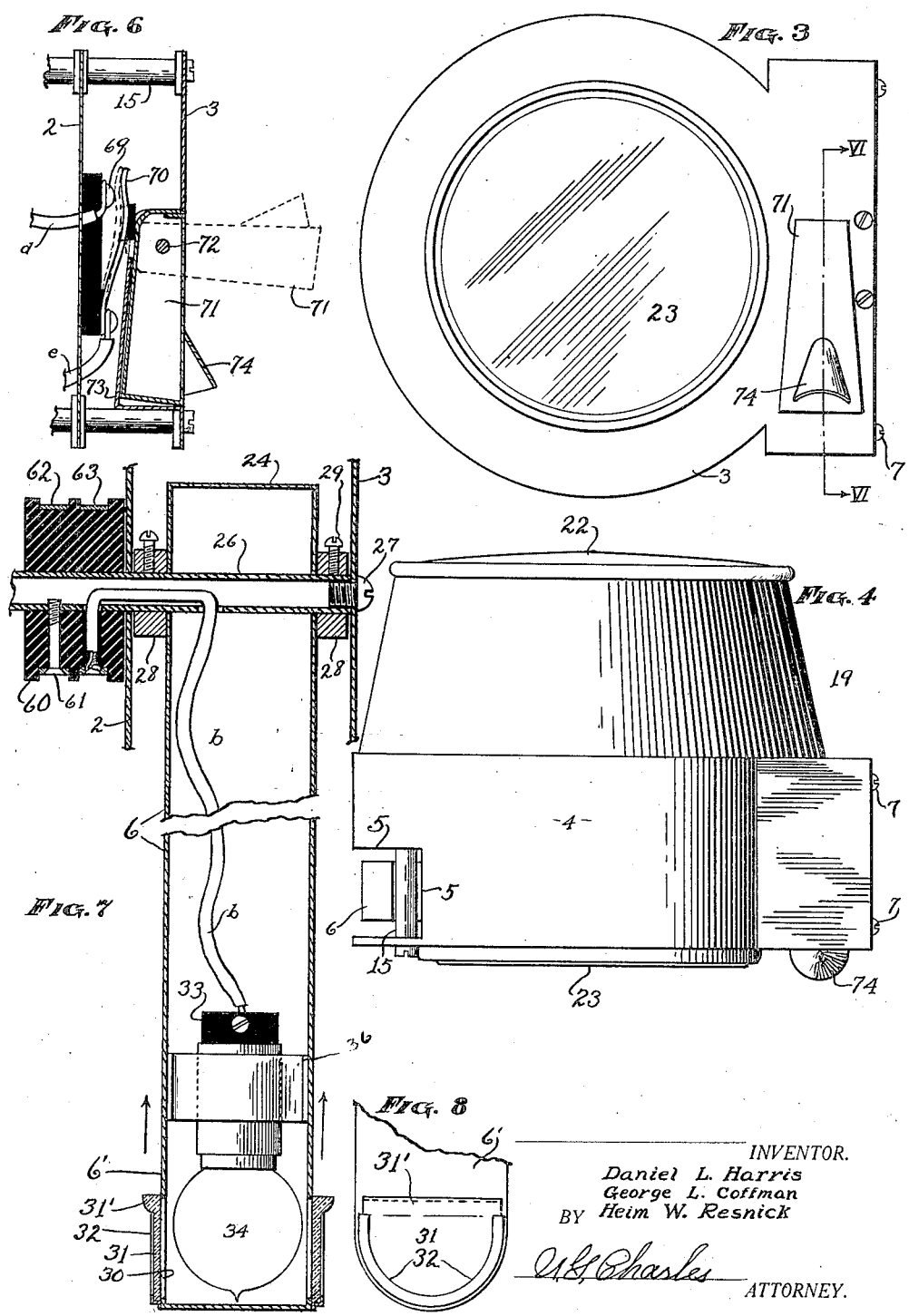

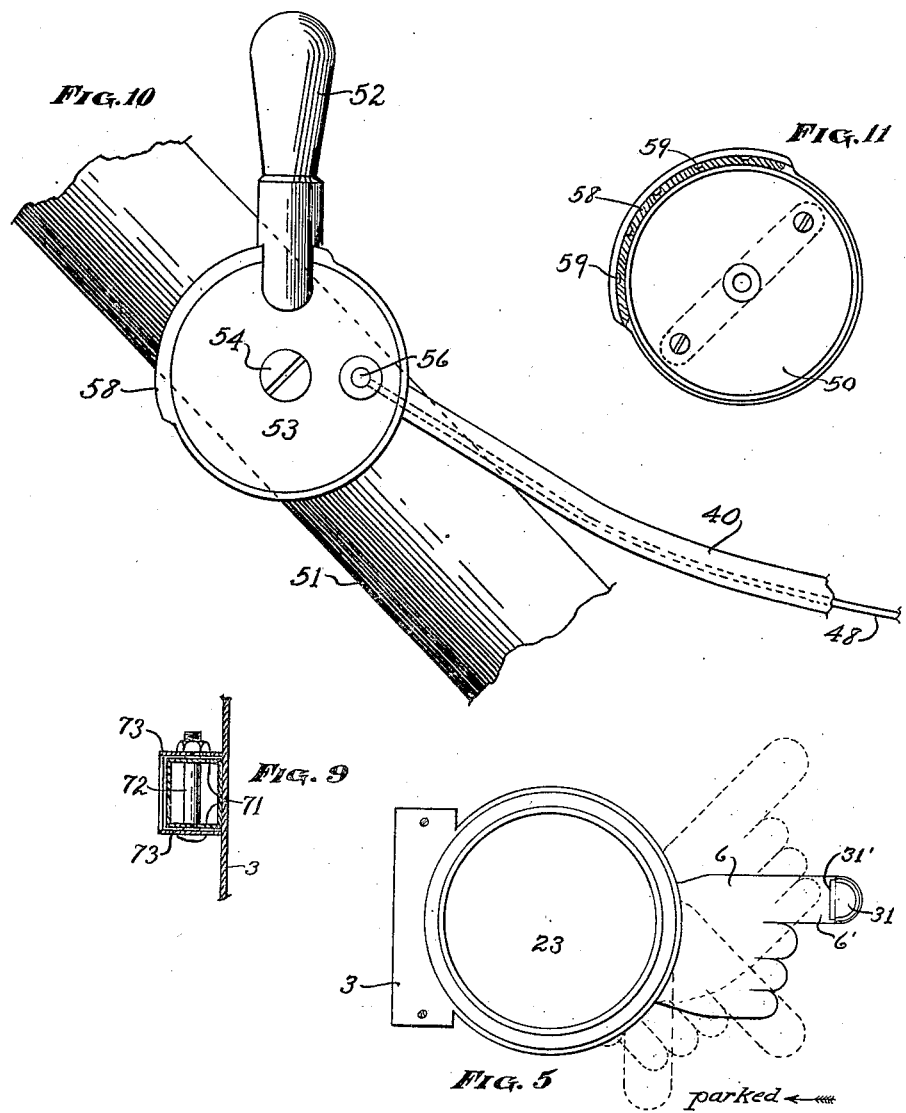

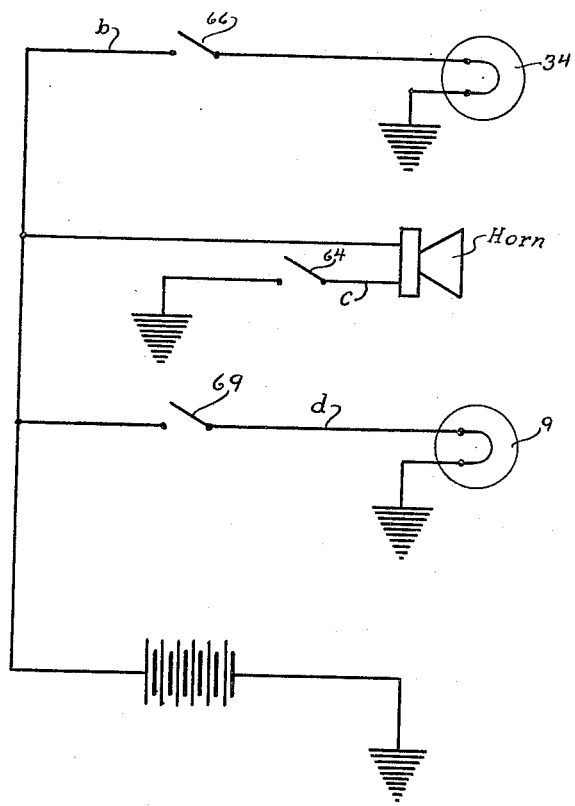

1,458,704

UNITED STATES PATENT OFFICE.

DANIEL L. HARRIS, GEORGE L. COFFMAN, AND HEIM W. RESNICK, OF WICHITA, KANSAS; SAID HARRIS ASSIGNOR OF ONE-SIXTH TO RAY G. ROGERS, OF PONCA CITY, OKLAHOMA.

COMBINED SIGNAL, SPOTLIGHT, AND MIRROR.

Application filed May 2, 1921. Serial No. 466,326.

*To all whom it may concern:*

Be it known that we, DANIEL L. HARRIS, GEORGE L. COFFMAN, and HEIM W. RESNICK, citizens of the United States, and residents of Wichita, in the county of Sedgwick and State of Kansas, have jointly invented a certain new and useful Combined Signal, Spotlight, and Mirror, of which the following is a specification.

Our invention relates to a combined signal, spot light and rear-vision mirror; and one object of our invention is to produce in a single commercial article a combination of the instruments mentioned, for use on motor vehicles.

A further object is to produce an improved traffic signal of the semaphore type, that is easily installed upon a motor car, and that is operated by a single lever located in convenient position to the driver's hand close to the steering wheel. The signaling device is so constructed as to indicate to other drivers, and pedestrians, the intended stopping, backing or turning of the car, and the direction of such turning. The signal comprises, essentially, a housing provided with means for attachment to a support on an automobile such as a windshield-frame, and a pivotally mounted hand or pointer, and manually-operable means for setting the pointer to several different position-angles. Our signal further comprises an improved motion-transmission within the housing, and other features noted below.

Further objects in view are to provide a combined apparatus of great compactness and light in weight; to protect all the mechanism and electrical parts from the elements; and to provide on the signal pointer, means for displaying a colored bull's-eye light at both front and rear, also for lighting the pointer itself with white light, all from a single light-bulb as the source.

These and other objects and advantages are attained by the construction disclosed in the accompanying drawings, in which—

Fig. 1 is a plan view of the complete device, omitting the circular parts of the housing; Fig. 2 is a vertical section on line II—II of Fig. 1; Fig. 3 is a rear elevation omitting the clamp and other parts; Fig. 4 is a plan view with cover-plate in position, omitting the clamp; Fig. 5 is a reduced scale elevation showing the pointer in two of its directive positions; Fig. 6 is a detail view of the lamp-circuit switch as shown by the sectional view taken along the line VI—VI, Fig. 3; Fig. 7 is a longitudinal section of the pointer, its bearings, and a part of one form of electric contact device; Fig. 8 is a detail view in elevation of one of the lenses which are a feature of the invention; Fig. 9 is a detail of the lamp-switch pivot; Fig. 10 is a detail view in side elevation of the control lever where a Bowden wire 48 is employed; Fig. 11 is a sectional detail of the quadrant; Fig. 12 shows a wiring diagram applicable to the invention.

Referring first to Figs. 1 and 2: The housing comprises three sheet-metal plates 1, 2, 3, of the same size and shape, connected by flanged bolts 15 in a well known manner, to form spaces in which the mechanism is enclosed. Rain and dust are largely excluded by a cover-plate 4 (Fig. 4) which is removable and has a slot 5 therein to allow the swinging pointer 6 to be projected into visible positions. This cover-plate is held in position by screws 7, some of which appear on Figs. 3 and 4.

At the inner side of the housing is a solid block of metal 8, on which is mounted any preferred form of combined swivel and clamp (or base) constructed to afford pivotal motion on axes normal to each other, to provide the necessary adjustability for the spotlight 9. As shown, the clamp-jaws 10 are adapted to grip a rod 12 which in the majority of cars will be a part of the outer windshield frame at the driver's left. Jaws 10 have a knuckle 13 pivoted on a pin 14, held by a yoke 16 rotatable on a studbolt 17 carried by the block 8; the nut 18 is so adjusted and positioned on the bolt 17 as to permit of the rotation of the yoke 16.

The spot-light housing 19 is secured to plate 1 in any suitable way, and contains a parabolic reflector, 20. The socket for bulb 9 is mounted on an insulation block 21, secured to plate 1. The anterior opening of housing 19 is covered by a glass disk or lens 22.

Upon the rear wall 3 of the housing is mounted a rear-vision mirror 23. When the spot light is not in use, this mirror is brought to the proper angles for the driver's use by adjusting the housing as above mentioned.

The signaling pointer is made preferably of sheet metal in the form of a hollow hand with forefinger extended. This hand comprises the flat walls 6 and a peripheral wall 24 soldered to the flat walls. The base of the hand, in line with the forefinger, is mounted on a tubular shaft 26, having bearings on screws 27 threaded into its ends and rotatable in holes in the outer housing plates 1, 3. Hub rings 28, soldered to plates 6, are slidable upon shaft 26, and are provided with set-screws 29 which fix the pointer 6 upon the shaft.

At the finger-tip, each plate 6 has a semicircular aperture 30 cut therein. Mounted over each aperture is a glass lens 31, comprising a plane portion 31 and a prismoid portion 31'. As shown, each lens is held in place by a sheet metal frame 32 soldered to the adjacent plate.

The receptacle 33 for the electric bulb 34 is mounted in a holder 36, secured between the plates 6 in any suitable manner. The bulb is positioned to cast its light through the lenses, and this feature makes the signal compicuous at any time but especially at night. The prisms 31' serve to deflect a portion of this light inwardly along the finger 6', as indicated by the darts, so that the whole hand will be illuminated from the bulb 34.

Before describing the electrical features of the mechanism, we will proceed to describe the preferred means for actuating the pointer.

Any mechanical movement whereby the pointer shaft may be rotated step by step from a point a couple of feet from the housing, will serve the purpose. On account of its being the simplest and the most easily installed, we prefer to use the transmission known as a Bowden wire, which is a stiff wire slidably mounted in a flexible metallic tube. The ends of such tube or sheath being immovably mounted, the movements desired are transmitted by longitudinal movements of the wire.

One end of the sheath 40 is secured to a nipple 41 by a nut 42. Said nipple is secured to a sleeve 43 on one of the framebolts 15. A sprocket wheel 44 on a shaft 46 has an eccentric pin 47, on which is an eye, not shown, secured to or formed by one end of the slidable wire 48. A driven sprocket 49 rigid on shaft 26 and a suitable chain or link-belt 45 connects the sprockets. The opposite end of the sheath 40 is secured to a drum 50 (Figs. 10, 11) provided with a clip for securing the drum to the "steering column" 51 of the automobile. The lever 52 is secured to a disc 53, rotatable on a screw 54. The inner face of the disc carries an eccentric pin 56, to which an eye on the end of the wire 48 is connected. Lever 52 has a self-releasing latch 52ˣ, having a point which is pressed by a spring 52ʸ against the quadrant 58 of the drum. In this quadrant are a series of depressions 59 in the path of the latch-point. When the latch engages, say, the lowermost notch, the pointer 6 will be fully housed within the housing, occupying a position shown in dotted lines on Fig. 2. By moving the lever to the next notch, the pointer 6 will be turned downwardly and outwardly, a proportional distance, thus making visible the finger 6' in the first directive position. Thus, the pointer may be set and held at any of several angles by setting the operating lever 52 correspondingly. An arbitrary meaning will be assigned to each position of the pointer. Any mechanical equivalent for the sprockets and chain may, of course, be employed. One reason for the mechanism just mentioned is that it converts a crank-pin travel of less than 180 degrees, into a crank-pin travel of more than 180 degrees, by making the driven sprocket smaller than the driving sprocket.

It is desirable that the current for illuminating the bulb 34 be saved when the pointer is at normal position. To this end, means are provided for automatically opening the lamp circuit when the hand nears its closed position. We also desire that the electric horn of the vehicle be sounded whenever the hand is placed at any directive position except the first. The first directive position, we intend to indicate that the driver is about to "park" the vehicle; and that the hand be left in such position as long as the vehicle is parked. Hence it would not do to have the horn circuit continuously closed when the hand is at "parked" position. We, therefore, provide means for closing the lamp circuit automatically when the hand is at any directive position; for closing the horn circuit when the hand is at any directive position except the first; and for opening both of said circuits automatically when the hand is returned to housed position.

One construction for these means is shown on Figs. 1, 2 and 7.

An insulating cylinder 60 is keyed on shaft 26 by a screw 61 which also holds upon the cylinder a metal segment 62. A similar conducting segment 63 is mounted on cylinder 60 close to segment 62. An insulated wire $b$ leads from lamp socket 33 to segment 63, as shown on Fig. 7. The other pole of said socket is grounded through the metal parts 36, 6, main housing, swivel, clamp, to the frame of the car (part 12).

A pair of conducting brushes 64, 66, properly operable from and mounted in an insulating block 67 secured to plate 2, contact the cylinder 60 in alinement with the segments. Segment 63, in the lamp circuit, is adjusted to contact its brush 66 before the other segment 62 will contact its brush 64, when the pointer is moved from normal. From the lamp brush, a wire $b'$ passes into a cable 68, thence to battery. From the horn brush, a wire $c$ passes into the cable, thence to the electric horn if the vehicle is provided with such a horn. These conductors are sufficient for both circuits, as the horn and the lamp 34 will both be grounded to battery, in the usual wiring system employed.

Fig. 6 shows one form of switch for controlling the spot-light 9. As shown, it comprises a point 69, a contact-spring 70 and a snap lever 71, which latter is flush with plate 3 when the switch is "open." Said lever is pivoted on a pin 72, held by a metal housing 73 secured to plate 3. (See Fig. 9.) From point 69 a wire $d$ leads to the spot-light receptacle. The wire $e$ taps the wire $b'$ which feeds the signal lamp 34.

The finger-piece 74 on switch-lever 71 permits said lever to be thrown up from its flush position, and the pressure of spring 70 holds the lever in either open or closed position, as will be apparent without description. Our object in making this lever close the spot-light circuit by throwing same to open position, is that by this device the said lever will have two functions, viz, it will serve as a handle by which the driver can conveniently direct the spot light, as the whole housing may be turned upon its bearings by grasping this handle. This construction also obviates providing a separate handle for the housing.

In lieu of the brush-and-segment arrangement shown, any preferred type of sliding contact devices may be employed. Such devices might be located within the hand or pointer.

It is thought that the operation of the signaling mechanism, in both its mechanical and electrical features, has been explained in the course of the specification.

Various changes in proportion, arrangement and construction of parts, and mechanical equivalents therefor, may be resorted to without passing beyond the scope of our invention. The horn-sounding feature may be omitted. The prismoid portions of the lenses 31 might be omitted, but only at a sacrifice of the advantage attained by this feature.

Having described our invention, we claim as new and desire to secure by Letters Patent:

1. A combined electric signal, spot light and mirror a housing having three plates spaced apart in parallelism to form front and rear compartments; a mirror on the rear surface of the back plate and a spot light and housing forwardly positioned from the front plate; a cover plate closing the compartments having a slot; a signaling pointer in the form of a hollow hand pivotally arranged in and concealed within one compartment and adapted to be projected outwardly through said cover plate slot into visible positions; an electric bulb within the hollow hand, and prism means for deflecting light to illuminate the inner parts of the hollow hand.

2. A combined electric signal, spot light and mirror a housing having three plates spaced apart in parallelism forming front and rear compartments; a mirror on the rear surface of the back plate and a spot light housed forwardly from the front plate; a cover plate closing the compartments having a slot therein; a signaling pointer in the form of a hollow hand pivotally arranged in and normally concealed within one compartment and adapted to be projected outwardly through the cover plate slot into visible positions; an electric bulb within the hollow hand, an opening in an extended forefinger portion of said hand, a glass lens in said opening adapted to deflect a portion of the light rays inwardly to illuminate inner portions of the hollow hand; sprocket wheel mechanism, chain driven, within the other compartment and operable from without for occasioning arbitrary pivoted movements to said pointer.

DANIEL L. HARRIS.
GEORGE L. COFFMAN.
HEIM W. RESNICK.

Witnesses:
M. J. CHARLES,
K. M. IMBODEN.